(12) United States Patent
Zahr

(10) Patent No.: US 10,001,783 B2
(45) Date of Patent: Jun. 19, 2018

(54) METHOD FOR CONTROLLING A WORK TRAIN

(71) Applicant: BOMAG GmbH, Boppard (DE)

(72) Inventor: Thomas Zahr, Pulheim (DE)

(73) Assignee: BOMAG GmbH, Boppard (DE)

( * ) Notice: Subject to any disclaimer, the term of this patent is extended or adjusted under 35 U.S.C. 154(b) by 0 days. days.

(21) Appl. No.: 14/964,910

(22) Filed: Dec. 10, 2015

(65) Prior Publication Data

US 2016/0170415 A1 Jun. 16, 2016

(30) Foreign Application Priority Data

Dec. 12, 2014 (DE) .................. 10 2014 018 533

(51) Int. Cl.
| | |
|---|---|
| *G05D 1/02* | (2006.01) |
| *G05D 1/00* | (2006.01) |
| *E01C 19/00* | (2006.01) |
| *E01C 19/48* | (2006.01) |
| *E01C 23/07* | (2006.01) |

(52) U.S. Cl.
CPC ......... *G05D 1/0293* (2013.01); *E01C 19/002* (2013.01); *E01C 19/004* (2013.01); *E01C 19/48* (2013.01); *E01C 23/07* (2013.01); *G05D 1/0027* (2013.01); *G05D 1/0295* (2013.01); *E01C 2301/00* (2013.01); *G05D 2201/0202* (2013.01)

(58) Field of Classification Search
CPC .. G05D 1/0293; G05D 1/0295; G05D 1/0097; G05D 2201/0202; G05D 1/0027; E01C 23/07; E01C 19/002; E01C 19/004; E01C 19/48; E01C 2301/00
See application file for complete search history.

(56) References Cited

U.S. PATENT DOCUMENTS

| | | | | |
|---|---|---|---|---|
| 4,347,016 | A | * | 8/1982 | Sindelar ................ E01C 23/065 404/95 |
| 5,921,708 | A | | 7/1999 | Grundl et al. |
| 6,467,992 | B1 | * | 10/2002 | Dietrich .................. E01C 19/48 404/101 |

(Continued)

FOREIGN PATENT DOCUMENTS

| | | |
|---|---|---|
| DE | 296 17 116 U1 | 11/1996 |
| DE | 297 15 467 U1 | 10/1997 |

(Continued)

OTHER PUBLICATIONS

Espacenet translation of EP0667415 description (5 pages).*

(Continued)

*Primary Examiner* — Dale W Hilgendorf
(74) *Attorney, Agent, or Firm* — Wood Herron & Evans LLP

(57) ABSTRACT

The present invention relates to a method for controlling a work train including a self-propelled road paver and a self-propelled feeder travelling ahead of the road paver, to a work train comprising a self-propelled road paver and a self-propelled feeder, as well as to a feeder and to a road paver for such a work train. According to one aspect of the present invention, the control of the road paver is effected automatically, to which end particularly the position of the feeder is determined and travel commands for the road paver are generated based on this information.

18 Claims, 7 Drawing Sheets

(56) References Cited

U.S. PATENT DOCUMENTS

| | | |
|---|---|---|
| 8,099,218 B2 | 1/2012 | Glee et al. |
| 8,337,118 B2 * | 12/2012 | Buschmann et al. ... E01C 19/48 |
| | | 404/84.5 |
| 8,517,628 B2 | 8/2013 | Weiser et al. |
| 2010/0215433 A1 | 8/2010 | Fritz |
| 2012/0101662 A1 | 4/2012 | Jensen |
| 2013/0189032 A1 * | 7/2013 | Bellerose ............. E01C 23/065 |
| | | 404/91 |
| 2016/0134995 A1 * | 5/2016 | McCoy ................ H04W 4/008 |
| | | 455/41.2 |

FOREIGN PATENT DOCUMENTS

| | | |
|---|---|---|
| DE | 299 02 419 U1 | 4/1999 |
| DE | 10 2011 018 469 A1 | 10/2012 |
| DE | 10 2014 001 488 A1 | 8/2015 |
| EP | 0667415 A1 * | 8/1995 ............. E01C 19/48 |
| EP | 1 516 962 B1 | 3/2005 |
| EP | 2 696 173 A1 | 2/2014 |
| WO | 2013/087275 A1 | 6/2013 |

OTHER PUBLICATIONS

Espacenet, English Machine Translation of Claim 1, German Patent No. DE29715467U1, published Oct. 30, 1997 (1 page).

Espacenet, English Machine Translation of Claims, German Patent No. DE29902419U1, published Apr. 29, 1999 (1 page).

Espacenet, English Machine Translation of Abstract, German Patent No. DE102011018469A1, published Oct. 25, 2012 (1 page).

Espacenet, English Machine Translation of Abstract, European Patent No. EP2696173A1, published Feb. 12, 2014 (1 page).

Espacenet, English Machine Translation of Abstract, German Patent No. DE102014001488A1, published Aug. 6, 2015 (1 page).

* cited by examiner

METHOD FOR CONTROLLING A WORK TRAIN

CROSS-REFERENCE TO RELATED APPLICATIONS

The present application claims priority under 35 U.S.C. § 119 of German Patent Application No. 10 2014 018 533.8, filed Dec. 12, 2014, the disclosure of which is hereby incorporated herein by reference in its entirety.

FIELD OF THE INVENTION

The present invention relates to a method for controlling a work train including a self-propelled road paver and a self-propelled feeder driving in front of the road paver, as well as to a work train including a feeder and a road paver. The present invention further also relates to a road paver and a feeder which are respectively configured for being used in such a work train.

BACKGROUND OF THE INVENTION

Road pavers, which as an alternative are also referred to as asphalt finishers, bitumen road surface pavers or simply as pavers, are used in road construction and essentially serve for laying the road surface. To that end, the road paver draws a special tool, which is called a paving screed or floating screed, at a most constant speed along the planned path of the road to be constructed during operation (paving process). The screed steadily smoothens and partially compacts the paving material supplied to the ground for the road surface, which material may be (rolled) asphalt, for example. A road paver of such type having a screed is further described in DE 10 2011 018 469 A1, for example. The already described ideally continuous speed of the road paver during the paving process (paving speed) ensures that the road surface is applied uniformly and smoothened, while interruptions or major fluctuations of the paving speed may lead to a complication of the paving process and, at worst, to irregularities in the road surface, for example, as a result of the sagging of the screed into the applied road surface.

The amounts of material paved during the paving process are very large, a modern road paver may in fact pave several hundred tons of paving material within an hour. For this reason it has proven to be advantageous that the road paver is supplied by a series of trucks, particularly dumper trucks, during operation, which typically commute between an asphalt plant and the road paver. Depending on the throughput of the road paver, a dumper truck loaded with paving material may arrive at the road paver every two to five minutes in order to load the paver. However, since the loading process requires coordination of the two vehicles, in this arrangement there is a risk that the desired continuous paving speed is affected to an unbearable extent due to the frequent change of the loading vehicles.

For this reason, use of a so-called feeder in addition to the road paver and the dumper trucks has proven to be expedient. The feeder is a special-purpose vehicle having the task of enabling an uninterrupted supply of the road paver with paving material. To that end, the feeder forms a work train together with the road paver. During operation, said feeder drives in front of the road paver and assumes the role of a buffer for paving material. The dumper trucks supply the paving material to the feeder, which is thus to be coordinated with the dumper trucks. The paving material is temporarily stored in the feeder and passed over to the road paver, for example, by means of a conveyer belt on the feeder, during which process one end of the conveyor belt is placed over an open material storage (bunker) of the road paver. This way, the feeder may virtually buffer the speed fluctuations occurring due to the coordination with the dumper trucks for the road paver, so that the road paver can advance at a most constant speed and ideally only the feeder needs to vary its speed to some extent. For example, such feeders may be special-purpose machines exclusively provided for this task, or also modified road pavers as disclosed in EP 1 516 962 A2. Thus, the feeder is characterized essentially by its function within the work train.

However, during the paving process, road paver and feeder need to be coordinated as well. On the one hand, the road paver needs to stay on a predetermined path so that it paves the road surface as intended. As long as the feeder advances on the same path, this means that the road paver needs to follow the path of the feeder as precisely as possible. On the other hand, it needs to be ensured that the end of the conveyor belt of the feeder is placed over the bunker at any time and that the loading process between these two vehicles is performed as intended. To that end, the road paver needs to follow the feeder such that the material discharge from the feeder into the bunker of the paver is performed completely and reliably. In addition, this implicates that the distance between the feeder and the road paver must neither grow so large that the paving material supplied by the feeder is discharged in front of the road paver instead of into the bunker nor so small that the two vehicles collide or that the discharge of the paving material is effected to other areas of the road paver, such as the operator platform.

Currently, this problem is solved commonly by the machine operator (driver) of the road paver and the driver of the feeder. To that end, the driver of the road paver drives the road paver following the path of the feeder, for example. Since he has better view over the region between the two vehicles, particularly the region between the end of the conveyor belt and the bunker, the driver of the road paver also monitors the distance between the road paver and the feeder and, if required, signals to the driver of the feeder should the distance between the road paver and the feeder become too large or too small. In response to that, the driver of the feeder needs to accelerate or decelerate or adjust the steering in order to restore a most ideal distance between the feeder and the road paver.

The above-described method has several disadvantages. For example, the situation of the driver of the feeder is very demanding in that he needs to coordinate with both the driver of the dumper trucks in front of the feeder (for the loading process) and with the driver of the road paver behind the feeder at the same time, and in addition has to ensure that the feeder stays on the predetermined path. In turn, the driver of the paver needs to monitor the distance between the feeder and the paver, the direction of travel and the speed of the paver as well the paving process per se. Thus, this process involves two individual drivers during the paving process and is highly demanding for both drivers.

SUMMARY OF THE INVENTION

It is, therefore, the object of the present invention to provide a method by means of which a self-propelled road paver and a self-propelled feeder driving in front of the road paver can be controlled such that reliable and less cost-intensive operation is possible.

In particular, said object is achieved by a method for controlling a work train of the above described type which comprises the following steps: S1: Driving the feeder by a machine operator (driving in this context meaning travel/movement control, not necessarily propulsion); S2: Determining movement data and/or position data of the feeder; S3: Generating travel commands (31) for automatic travel control of the road paver in consideration of the movement data and/or position data of the feeder; and S4: Automatic travelling of the road paver (3) using the travel commands.

In this regard, driving the feeder by the machine operator means that a machine operator controls the feeder with respect to its position, speed and orientation. The driver of the feeder drives the feeder in a manner that it essentially moves along the road to be constructed with its path. The feeder often times moves in a halting manner since the paving material is supplied by the transport vehicles at intervals. The feeder is self-propelled and thus comprises its own energy supply, typically an internal combustion engine, by means of which the energy required for operation and particularly also for the propulsion of the feeder is provided.

The term position data of the feeder refers to the position or orientation of the feeder, or of components or reference points arranged on the feeder, relative to a reference system. The reference system may be a local (or internal) or a global (or external) reference system. A local reference system refers to a reference system that moves along with the work train or the road paver, as would be obtained from the central axes of the road paver or an intrinsic coordinate system of a sensor arranged on the road paver. Thus, the local reference system may be the feeder itself, for example, wherein in this case position data may be the position of the feeder relative to the road paver, for example. The same applies particularly to the road paver, which may also itself represent the local reference system. On the other hand, examples of a global (or external) reference system are GPS coordinates, the coordinate system of a sensor fixed in location on the construction site, or also the path per se. In contrast, movement data describe a time-dependent change of the position data referring to the feeder as a whole, namely, for example, the speed in the travel direction (travel speed) for straight travel or the angular speed about the yaw axis (yaw speed) for turning the feeder. The term movement data also includes its time-dependent changes per se, i.e., for example, acceleration. Specific ways and manners of how the movement data and/or position data can be ascertained will be described below in connection with preferred specific embodiments of the method according to the present invention.

In the context of the present invention, the term travel commands refers to steering and/or control instructions, for example, with respect to travel speed, direction, position, etc. These specifications particularly refer to the road paver. The structure of the travel commands and for which values they contain specifications may vary according to different embodiments of the method. Just to mention one example, while the travel commands are preferably encoded as a digital signal, they may as well be encoded in an analog form. The specific encoding used depends particularly on how the travel commands are further processed at the road paver or whether a specific encoding is required for transmission of the travel commands (e.g., Packet Binary Convolutional Coding (PBCC) for certain wireless transmissions). The travel commands may also be re-encoded if required, provided the information of the specifications is maintained. In any case, the road paver, or a control unit or an upstream data processing unit of the road paver, must finally be capable of interpreting the drive commands.

The term "consideration" of the movement data and/or position data of the feeder when generating the travel commands refers to the fact that said movement data and/or position data are in some way used for calculating or generating the travel commands. For example, the movement data and/or position data may serve as input values for a method (e.g., an algorithm) by means of which the travel commands for the road paver are generated or calculated. However, the travel commands need not exclusively be generated from the said movement data and/or position data of the feeder. Further data may be considered or serve as input values for a method for generating travel commands, for example. Additionally, movement data and/or position data of the road paver or general data such as time, operating period, temperature, loading state, etc. may as well be considered, for example.

Automatic travelling of the road paver means that the road paver automatically performs or implements the travel commands without intervention of a human or a manual input by the driver being required. Thus, in particular, it is no longer required that the road paver has a driver per se; the control of the entire work train requires only one driver, who is working at the operator platform of the feeder. Eventually, the operator platform of the road paver is thus also superfluous. Further, the road paver is also configured in a self-propelled manner and thus preferably comprises its own energy supply, particularly an internal combustion engine, by means of which the operating power required for the travelling and working operation is supplied. The method according to the present invention enables the road paver to essentially follow the feeder during the paving process without direct manual control by the driver. Thus, the method according to the present invention enables a type of "electronic drawbar" between the feeder and the road paver, wherein in this case there is no need to maintain a static distance between the two vehicles. Instead, the distance between the two vehicles is rather within a desired range that allows performing a reliable loading process of the paving material from the feeder to the road paver. As a result, it is possible that the road paver moves at a very constant working speed even if various transport vehicles alternately supply paving material to the feeder.

In a preferred embodiment of the method according to the present invention, the above-described method steps are permanently run through, or cycled through, during the operating process, particularly in a clocked manner. This particularly includes that the determination of the movement data and/or position data of the feeder, the generation of travel commands and the execution of the travel command on the road paver, or the adjustment of the control of the road paver to the travel command, are run through in a clocked fashion. Thus, in other words, these steps are performed at a frequency determined by configuration or programming of the machines used for the specific implementation of the method. When selecting a suitable frequency, requirements depending on the operation or the machine need to be observed, which for the minimum value of the frequency result from the average, extreme or ideal values for the distance between the road paver and the feeder or from a maximum speed difference of the two vehicles to be expected during the operating process. Although a higher frequency is generally always advantageous when performing the method, it increases the requirements (and thus the cost) for sensor, data processing and control devices.

Preferably, step S2 includes at least one of the following steps: S2a: Retrieving control commands for the feeder from a control system of the feeder; S2b: Generating sensor data for the position and/or orientation and/or speed of the feeder relative to the road paver; or S2c: Generating sensor data for the position and/or orientation and/or speed of the feeder relative to an external reference system. Said data respectively represent the movement data and/or position data required for the method or are included therein. Thus, according to the method, it is provided in step 2a that particularly for determining drive commands a control system of the feeder is directly accessed. This may only include software solutions, for example, but may also include sensors which detect and evaluate actuation of operating elements of the feeder, such as actuation levers, etc. According to step S2b, provision is made in addition or as an alternative to steps S2a and/or S2c for sensor data to be determined between the feeder and the road paver with respect to the feeder. Thus, by means of this step, detection of the two vehicles of the work train is achieved only relative to one another. According to step S2c, in further addition or as a further alternative to steps S2a and/or S2b, provision may be made for respective sensor data with respect to an external reference system to be determined, such as GPS, a reference station on a construction site, etc. Thus, the relative position of the feeder to said external reference system may be determined by means of said method step.

Advantageously, step S3 comprises the following steps: S3.1: S3.1: Generating target values for movement data and/or position data of the road paver from the movement data and/or position data of the feeder; S3.2: Determining actual values for the movement data and/or position data of the road paver; and S3.3: Generating a control command for automatic control of the road paver in consideration of the target values and the actual values for the movement data and/or position data of the road paver. Consideration of the target values and actual values is important—depending on the specific embodiment of the method—in that adjustment of the actual values to the target values usually is to be performed continuously. From a regulation view, a control loop for the movement data and/or position data of the road paver is obtained, which the feeder by means of the movement data and/or the position data has a disturbing effect to, said disturbances being continuously balanced toward the target values. It is important that said process is preferably subordinated to a travel movement of the road paver which is as constant as possible. This means that the method is performed such that the road paver follows the feeder but does so at a most constant speed. This can, for example, be realized in that a feedback to the feeder is provided, as will be yet explained in the following.

In another advantageous embodiment of the method, movement data and/or position data of the feeder from previous cycles are particularly considered in step S3 as well. This way, it is possible that the road paver does not adjust its orientation to the current orientation of the feeder, but to the orientation that the feeder had when it was at the current position of the road paver, for example. For this purpose, it is particularly suitable to consider movement data and/or position data in a global reference system, as described above. When generating the travel commands, the movement data and/or position data gathered from previous cycles can as well be used as input data for mathematical methods, such as interpolation or extrapolation methods or predictive methods or statistical learning methods. The advantage of this refinement becomes particularly apparent in turning or curve maneuvers of the work train. The road paver then follows the path of the feeder even when in a curve, so that it is possible to determine the actual path of the road paver by means of the feeder.

Also, particularly preferred is an embodiment of the method in which in step S3 the travel command is configured such that the distance between the road paver and the feeder is kept within a buffer interval, if possible. The buffer interval, in particular, results from the dimensions of the bunker on the road paver as well as the dimensions of the conveyor belt on the feeder. In this embodiment, particularly the speed of the road paver is kept as constant as possible as long as the distance between the feeder and the road paver is within the buffer interval. Hence, the road paver is ideally controlled such (or the travel command is configured such) that as a first priority, the end of the conveyor belt is always located above the bunker of the road paver, and as a second priority the speed of the road paver is kept as constant as possible. This embodiment is advantageous in that the feeder can accelerate and decelerate during the operating process, e.g., when docking to a new transport vehicle, without the constant driving movement of the road paver needing to be interrupted. Thus, differences in the movement pattern of the feeder and the road paver can be balanced to one another by means of the buffer interval.

In the case that the work train finds itself in a situation in which the two described priorities (constant operating speed of the road paver and distance within the buffer interval) are no longer compatible with each other, or if it moves toward such a situation (and if this is detected during the generation of a travel command, for example, by an analysis of movement data and/or position data), as an alternative the road paver can be controlled such (or the travel command can be configured such) that the speed of the road paver is adjusted (i.e., increased or decreased). Preferably, this adjustment of speed is not effected abruptly, but smoothly, i.e., over a longer period of time, for which purpose the buffer range can be utilized entirely. If, for example, the feeder is stopped abruptly, the road paver can be controlled such that it implements this braking operation over a longer period of time in a stretched manner, thereby utilizing the buffer range. If the feeder is suddenly accelerated, the road paver can be controlled such that it implements the acceleration operation over a longer period of time in a stretched manner. Due to the use of the buffer range and the delay in the braking and accelerating operations, the road paver can be operated particularly constantly and also in an energy-saving manner, for example.

Preferably, also in step S3 the travel command is configured such that the road paver follows the path of the feeder, i.e., with a delay due to distance and speed, takes the current position of the feeder in continuous operation. In other words, the road paver keeps the same path relative to the feeder. This provides the advantage that the position of the paved path can be controlled from the feeder as precisely as possible.

Naturally step S1 is performed at the feeder and step S4 at the paver. However, there are multiple preferred alternatives for arranging method steps S2 and S3, each providing different advantages, as will be described below.

In a preferred embodiment, steps S2 and S3 are performed at the road paver or from the road paver, respectively. This provides the advantage that for carrying out the method a specialized road paver may be used along with a feeder which has not been designed particularly for carrying out the method. In particular, communication (in terms of signal and data communication) between devices used for determining the movement data and/or position data (e.g., sensors) and devices used for generating the travel command (data processing devices such as computers) is then exclusively performed at the road paver, and the method does not require an active communication between the feeder and the road paver.

Another preferred embodiment provides for the steps S2 and S3 to be exclusively performed at the feeder. Thus, in this variant, the method comprises an additional transmission of travel commands from the feeder to the road paver. This configuration of the work train according to the present invention provides the advantage that the required adjustment measures on the road paver are comparatively simple and therefore inexpensive compared to a conventional road paver.

Finally, it is possible as well and therefore included by the present invention that step S2 is performed at the feeder and step S3 at the road paver. Thus, the method then comprises transmitting movement data and/or position data from the feeder to the road paver. For the latter two alternatives described, at least a (at least one-directional) signal or data communication between feeder and road paver is required, preferably a communication that allows communication in both directions between road paver and feeder (bidirectional communication). One advantage of this is the fact that such communication between feeder and road paver can additionally be used for transmitting a manual control command from the driver of the feeder to the road paver, for example, if a problem occurs during working operation or in the case that the working operation needs to be interrupted. For example, an emergency stop signal from the feeder could readily be transmitted to the road paver so that the road paver performs the emergency stop function simultaneously. In this way, the driver of the feeder keeps a better control of the entire work train.

In a particularly preferred embodiment, a feedback of the control of the road paver to the feeder is effected such that a warning notice is displayed on the feeder or an automatic control adjustment is performed if the distance between the feeder and the road paver is beyond a buffer interval, for example. In this regard, the buffer interval preferably is the buffer interval already described above, which is obtained by the relative positions of the conveyor belt of the feeder and the bunker of the road paver, or an inner buffer interval lying within this interval. The above-described warning notice aims at indicating to the driver of the feeder that he has to adjust the distance between the feeder and the paver as soon as possible in order to ensure uninterrupted further performance of the paving process. The alternative performance of an automatic control adjustment relieves the driver of the feeder from this task and performs the required adjustment of the course or the speed of the feeder on its own. In particular, the performed control adjustment is a one-time adjustment relating only to individual movement variables of the feeder, such as acceleration, a braking maneuver or a minor adjustment of the steering angle. After a one-time adjustment, ideally the driver takes the control of the feeder again so that the entire work train does not get out of control. Thus, the control adjustment then only has an assistance function.

In step 4, it is particularly advantageous if the automatic travelling of the road paver is effected using the travel commands in accordance with a hierarchic safety system which allows overriding the travel commands by manually triggered commands. In particular, such manually triggered commands are stop commands. In this way, it can be ensured that a manual overriding of the automatic travel commands is always possible. Even if the road paver drives largely automatically, this way it can be ensured that a manual intervention is always possible in cases of emergency, and, in particular, that an emergency stop of the road paver can be effected.

Apart from the method described, the object is further achieved by a work train which comprises a self-propelled road paver and a self-propelled feeder, wherein during working operation the feeder drives in front of the road paver in the operating direction. The road paver comprises a paver control device configured to automatically control the road paver. The feeder or the road paver comprises a sensor device for generating movement data and/or position data of the feeder, and the feeder or the road paver comprises a data processing device which is configured to generate travel commands for the paver control device in consideration of the movement data and/or position data of the feeder. It is essential to the configuration of the work train according to the present invention that it is capable of detecting the positions and/or movements of the feeder and of generating control commands for the road paver based thereon, which commands are realized automatically at the road paver. In contrast to the prior art, a separate driver for the road paver is no longer required and at the same time a more constant working operation of the road paver within the work train is enabled.

In a preferred embodiment, the sensor device specifically includes a distance sensor device for measuring a distance between the road paver and the feeder. The functionality of the distance sensor device may be based on a variety of different sensor technologies, for example, distance measurement can be effected by means of laser, radar, lidar or cameras. For measuring the distance, the distance sensor device may also include software or firmware for pre-processing the generated sensor data, for example, in the case of smart cameras. The distance between the road paver and the feeder can be measured between the distance sensor device (or a sensor of the distance sensor device) and a reference point on the respective other vehicle. If, for example, the distance sensor device is mounted on the road paver, the distance can be measured or determined between the distance sensor on the road paver and a reference point on the feeder. The distance sensor device may consist of an individual distance sensor (sensor), for example, but it consists preferably of multiple sensors which can work independently from one another or together. On the one hand, this enables more precise measuring and, additionally, redundant coverage so that reliable distance measurement can still be ensured even upon occurrence of malfunction, disturbance or masking of individual sensors. It is possible that multiple sensors each measure the distance to a single reference point or that each sensor measures the distance to a different associated reference point, so that different sensors are directed to different reference points. On the one hand, several sensors of the same type can be used, on the other hand it is as well possible to use different sensors using different technologies in order to cover a greater spectrum and obtain a higher scanning reliability. In such cases, at least one data processing device is then preferably included which is configured such that it performs a fusion of the sensor data.

In another preferred embodiment of the present invention, the sensor device includes a position sensor device which is configured for determining the position of the feeder or the road paver respectively, the position sensor device particularly including means for determining the position of the feeder or the road paver relative to the respectively other vehicle and/or means for determining the feeder or the road paver relative to an external reference point or reference system, for example, a total station or a satellite navigation system. Basically, a position sensor device is different from a distance sensor device in that it does not provide a (one-dimensional) distance between two points, but two, three, or more-dimensional position data of points (individual reference points, for example) or objects (the feeder, for example) in a reference system. This also includes data referring to the orientation of objects. For this purpose, however, a distance sensor device can as well be used if a method for relating the respective distances (e.g., by means of a triangulation) is additionally used. For determining the position of the feeder and the road paver relative to one another, basically the same sensor technologies can thus be used as described above with respect to the distance sensor device. For determining the position of the feeder or the road paver relative to an external reference point or reference system, other types of sensor technologies may be considered as well, for example, satellite navigation (such as GPS or Galileo) or position determination by means of an external total station (tachymeter) installed on a construction site.

Depending on the specific configuration of the work train according to the present invention, it may be required that the feeder and the road paver are communicating with each other, for example, for the transmission of travel commands. Although wired connections can basically be used as well to that end, it is advantageous if the work train includes at least one communication device having a transmitter for contactless communication on the feeder and a receiver which is compatible to the transmitter on the road paver, in particular, the transmitter being configured for transmitting the movement data and/or position data of the feeder or the travel commands to the receiver. Preferably, this communication device is configured such that bi-directional communication between the road paver and the feeder is enabled. This way, on the one hand it becomes possible to exchange data determined at both vehicles, particularly movement data and/or position data, between control devices (for example, the paver control device) and/or data processing devices on different vehicles of the work train. In this way, a greater flexibility in the arrangement of the sensors of the sensor device can be achieved on the two vehicles. Also, a feedback of the control device of the road paver to the feeder can be effected by means of such bidirectional communication as described above. Different communication technologies may be used for contactless communication, wherein communication may be performed without establishing connections (for example, via radio transmitters/receivers) as well as by means of a communication connection (for example, via Wireless LAN).

In a preferred embodiment, the road paver includes at least one lateral operator panel, which in turn includes an emergency switch and/or a distance screen for monitoring the distance between the road paver and the feeder, particularly the emergency switch being configured for generating a stop command which is hierarchically higher than the travel commands of the automatic control of the road paver. The lateral operator panel is typically arranged at the screed of the road paver. The purpose of the lateral operator panel is that a construction worker walking next to the road paver, who monitors the paving process, may simultaneously monitor the distance between the road paver and the feeder and trigger an emergency stop via the emergency switch in cases of emergency. Advantageously, provision may be made for said emergency switch to also cover the feeder, for example, by means of a suitable communication line, so that in this case the entire work train is stopped.

In a particularly preferred embodiment, the road paver does not include an operator platform. In this way, the road paver per se is simplified and can therefore be produced at more favorable costs. To provide a greater operational flexibility of the road paver, it is conceivable that the road paver without operator platform is configured such that it can be equipped with an operator platform at a later time. Accordingly, in this case the respective connections for devices and operating elements in the operator platform are already provided on the road paver. Alternatively, it is also possible to provide the road paver with a replaceable or detachable operator platform so that, depending on the requirements, the road paver can be operated both with and without an operator platform. In this case, the operator platform is only an additional module for the road paver. This variant provides the greatest possible flexibility in the use of the road paver.

In a particularly preferred embodiment, the work train is configured for performing the method according to the present invention.

The object of the present invention is further achieved by means of a road paver configured for use in a work train according to the present invention. Said road paver is particularly characterized by the paver control device and its suitability for receiving travel commands and implementing them at the road paver in order to enable an automatic operation of the road paver without a separate driver being required. Thus, the road paver is controlled to a considerable extent by the feeder driving in front of it and it is connected to said feeder by means of a "virtual" drawbar.

The object of the present invention is also achieved by means of a feeder configured for use in a work train according to the present invention. Such a feeder intended specifically for use in a work train according to the present invention is characterized by an above-described sensor device on the feeder for generating movement data and/or position data of the feeder and/or a data processing device for generating travel commands for the road paver based on position data and/or movement data of the feeder as well as by a device for communication with the road paver for transmitting position data and/or movement data and/or travel commands.

BRIEF DESCRIPTION OF THE DRAWINGS

The present invention will be described in greater detail below with reference to the exemplary embodiments shown in the figures. In the schematic figures

Like components are designated in the figures by like reference numerals, however not each component appearing repeatedly is necessarily designated separately in each figure.

DETAILED DESCRIPTION OF THE INVENTION

Figure 1:
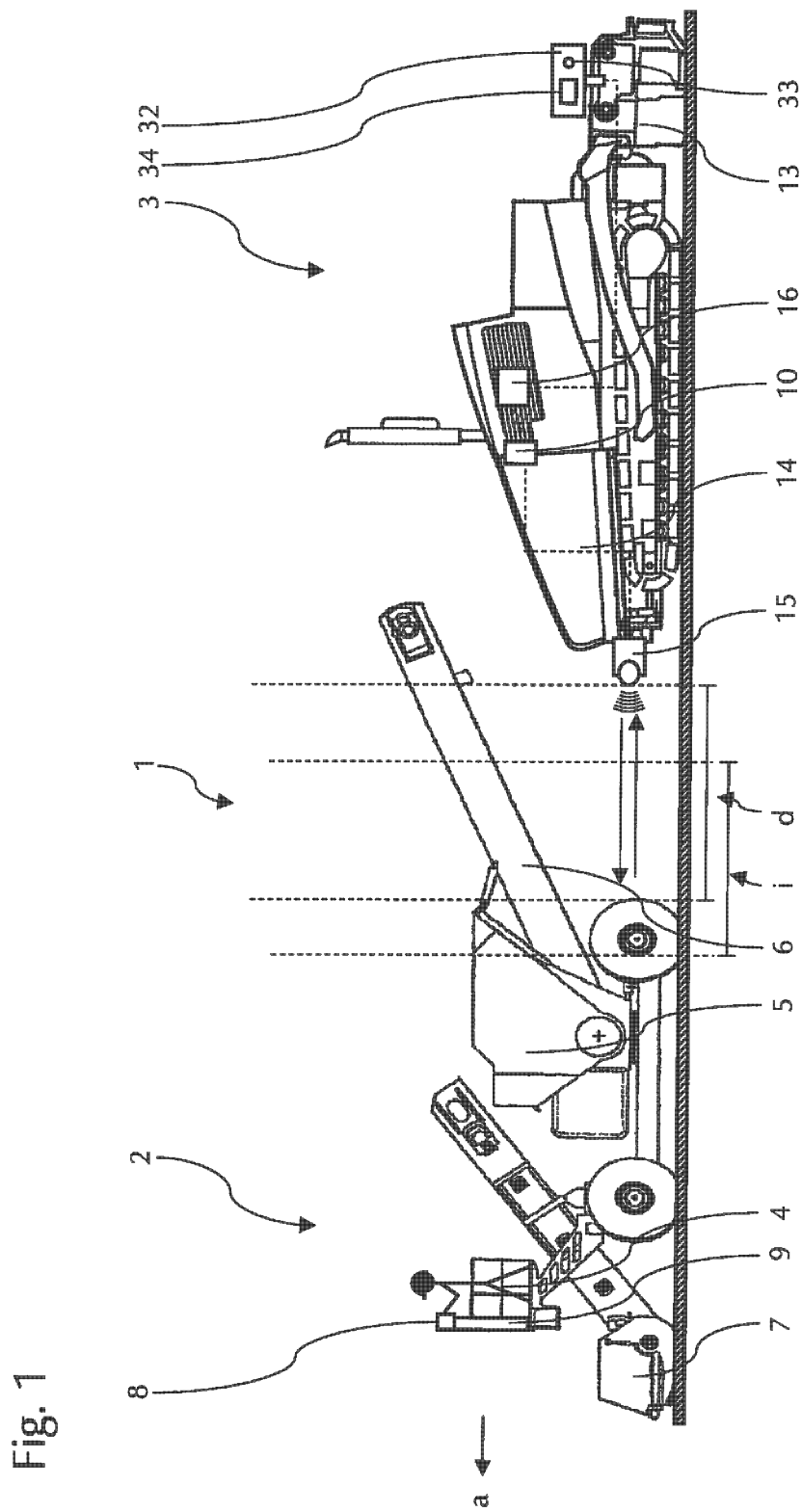
FIG. 1 is a side view of a work train according to the present invention.
Figure 2:
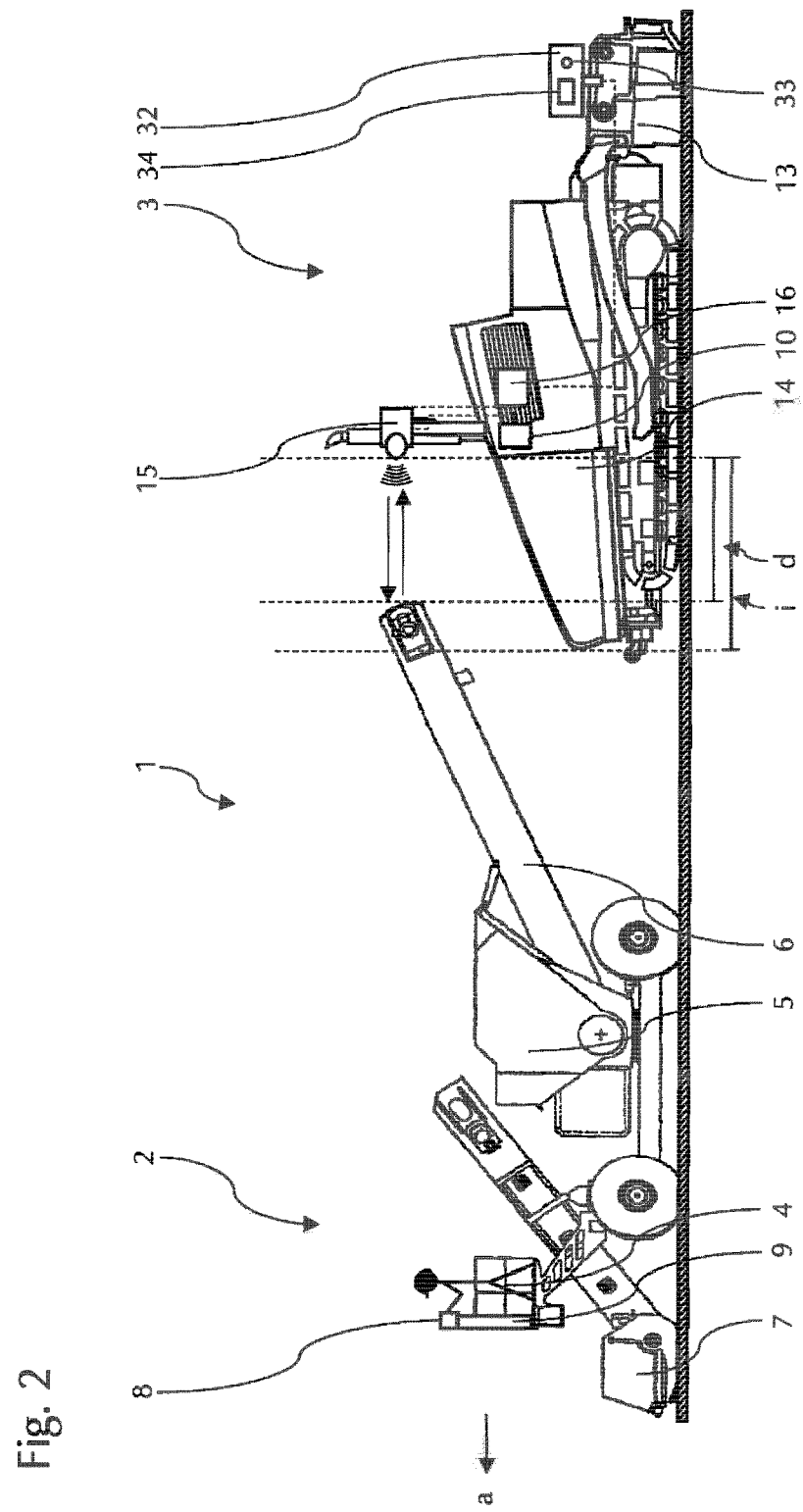
FIG. 2 is a side view of an alternative embodiment of a work train according to the present invention.
Figure 3:
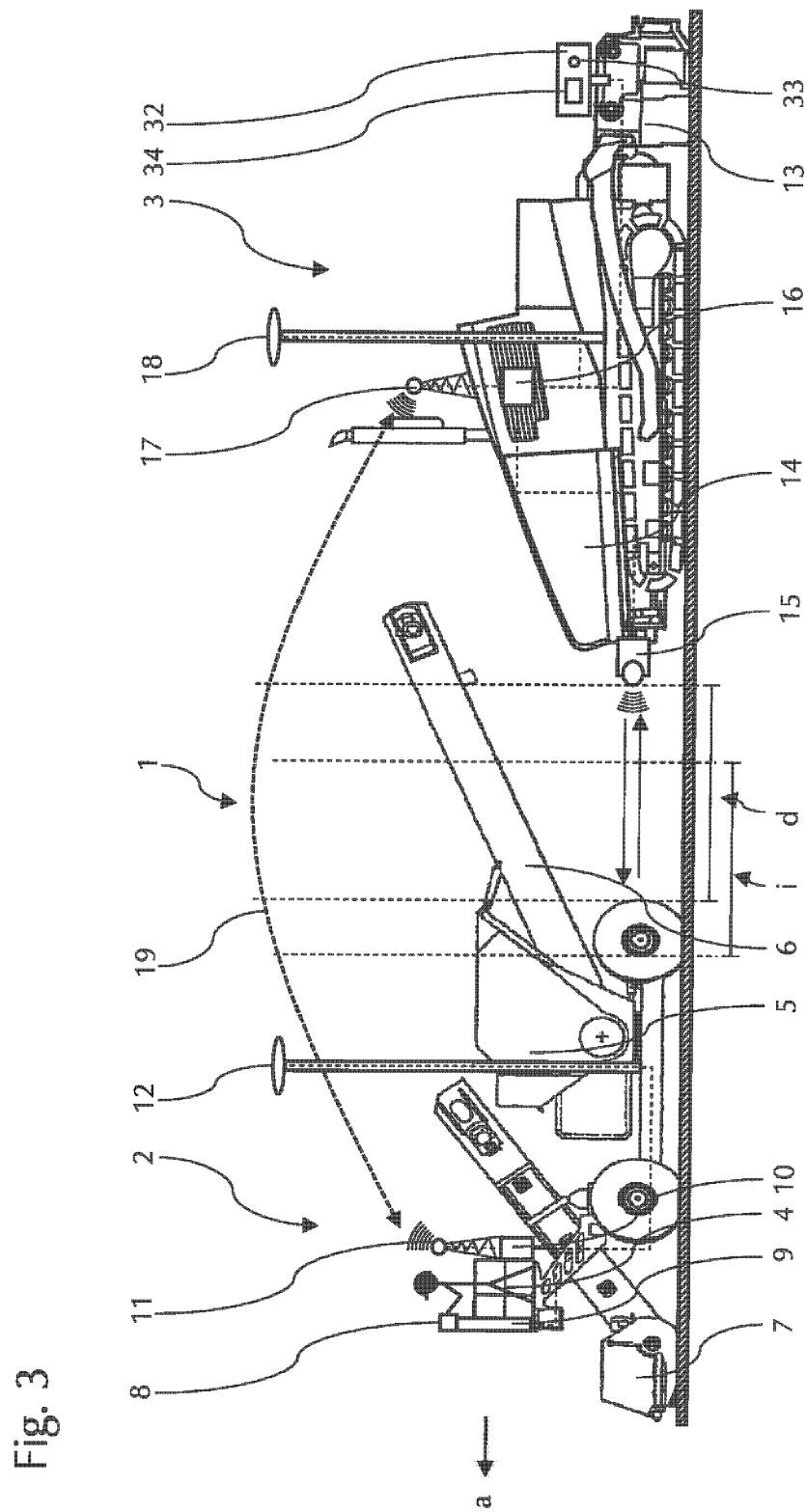
FIG. 3 is a side view of another alternative embodiment of the work train according to the present invention.

FIGS. 1 to 3 show different embodiments of a work train 1 according to the present invention for bitumen road surface paving, which comprises a feeder 2 and a road paver 3. In working operation, the feeder 2 drives in front in working direction a and is repeatedly supplied with paving material from a dumper truck (not shown). The dumper truck approaches the feeder 2 backward, uncouples, and is pushed by the feeder 2 while emptying the paving material into the receiving container 7 of the feeder 2. Once the dumper truck is completely unloaded, it disconnects from the feeder.

The feeder temporarily stores the paving material in the bunker 5 and passes it over to the road paver 3 by means of a conveyor belt 6 and thus supplies or feeds the road paver with paving material. For controlling the feeder 2, the latter comprises an operator platform 4 for a machine operator with a control panel 8 for inputting the control or steering commands of the feeder 2. Furthermore, the feeder 2 has a central feeder control unit 9 in which the travel commands and other control commands input by the machine operator are processed and transmitted to individual controllable elements of the feeder.

The road paver 3 follows the feeder 2. In doing so, it draws the screed 13, which rests on the road surface in a floating manner, for example. To allow a most uniform paving, the screed 13 should be drawn by the road paver 3 with an essentially constant speed. A stopping of the road paver 3 or a drastic change of its speed may result in irregularities in the road surface, for example, due to a sagging of the screed 13. In order to be able to continuously supply the screed 13 with paving material, the road paver 3 has a bunker 14, in which the material supplied by the feeder 2 can be stored temporarily.

Both vehicles 2 and 3 each comprise an internal combustion engine (not shown) for generating the drive energy required for operation.

During working operation, the road paver 3 follows the feeder 2 at a distance d in working direction a, wherein the distance d should be within an interval i. This interval i, also referred to as buffer range, results from the fact that the end of the conveyor belt 6 of the feeder 2 should always be located above the bunker 14 of the road paver 3 in order to be able to completely load the paving material over into the bunker 14 of the road paver 3. If distance d becomes too large, the road paver 3 drives behind the conveyor belt 6 and cannot be fed with paving material. If distance d becomes too short, the bunker 14 is located completely underneath the conveyor belt 6 and a supply into the bunker 14 cannot be performed. There is also a risk of a collision of the two vehicles 2, 3 should the distance be too short. In the exemplary embodiment shown in FIG. 1, it is now provided that the road paver 3 automatically follows the feeder 2. The travel commands of the road paver are not determined by a driver on the road paver but generated and implemented automatically, as will be described in greater detail below. In particular, this is achieved by means of the devices "sensor device 15", "data processing device 10" and "paver control device 16".

In the embodiment shown in FIG. 1, distance d is monitored by means of the distance sensor device 15, which is mounted on the road paver 3 in the example shown. More precisely, the distance sensor device 15 is mounted at the height of the crawler tracks on the front end of the road paver 3 and measures the distance between the sensor device 15 and a reference point on the feeder 2, in the present case, for example, the wheel of the feeder 2. By means of the distance sensor device 15, the work train 1, or more precisely the road paver 3, determines the relative position of the feeder 2 to itself. The sensor data generated by the distance sensor device 15 is processed in the data processing device 10 and converted into a travel command for the paver control device 16. After that, the paver control device 16 ensures that the road paver 3 automatically implements this travel command in order that the distance d or the orientation of the feeder 2 and of the road paver 3 are adjusted relative to one another. The travel command(s) are thus directed to the distance d between the feeder 2 and the road paver 3 ranging within a set allowed distance range. The data processing device 10 and the paver control device 16 are thus adapted to control the road paver 3 such that it follows the feeder 2 most uniformly at a distance within the distance interval allowed.

In order to increase safety, the road paver 3 further comprises a lateral operator panel 32 at the screed 13, which comprises a distance screen 34 and/or an emergency switch 33. With the emergency switch, the automatic control of the road paver can be overridden and an emergency stop of the road paver can be triggered as a result. This may be required in a situation that constitutes a hazard for the working operation or the safety of the persons working on the construction site but cannot be detected by the sensor device properly.

In an alternative to FIG. 1 (not shown here), it is further possible to mount the sensor device 15 and/or the data processing device 10 on the feeder 2, wherein the sensor device 10 then determines and monitors the distance to the road paver 3 from the feeder 2.

In the embodiment shown in FIG. 1, the entire processing chain (generation of sensor data, processing of sensor data into a control command, implementation of the control command) required for performing the method according to the present invention is arranged on the road paver 3. This provides the advantage that an individual, specialized road paver 3 can be used with a greater spectrum of different, even conventional feeders and only little or even no retrofitting is required for the feeders for making them suitable for performing the method according to the present invention.

The embodiment shown in FIG. 2 is different from the embodiment shown in FIG. 1 in that the distance measuring device 15 was arranged at a greater height on the top side of the road paver 3, when viewed in longitudinal extension approximately at the same level as the rear end of the bunker 14. The end of the conveyor belt 6 constitutes the reference point for the distance measurement on the road paver 3. The measured distance d is no longer the distance between the front end of the road paver 3 and the wheel of the feeder 2, but essentially corresponds to the distance between the rear end of the bunker 14 and the end of the conveyor belt 6. The size of the interval i remains unchanged since it depends on the dimensions of the bunker 14, which are equal in both embodiments. For example, this embodiment thus comprises a support mast on the road paver 3 in order to be able to arrange the sensor device at an elevated position.

FIG. 3 illustrates another embodiment of a work train 1 according to the present invention, in which a greater spectrum of sensors is used. As before, a distance sensor 15 on the front side of the road paver 3 is included. In addition thereto, a position sensor device 18 on the road paver and a position sensor device 12 on the feeder are provided. These position sensor devices 12, 18 in the present case work on a satellite navigation basis and are suitable for determining the position of the construction machine 2, 3 with an accuracy of to within a few centimeters. Additionally, a communication device is provided on the work train 1 which comprises a transmitter/receiver 11 on the feeder and a transmitter/receiver 17 on the road paver. Both transmitters/receivers 11, 17 communicate with each other in a contactless manner by means of a bidirectional communication device 19 and, inter alia, communicate position data determined by the position sensor devices between the feeder 2 and the road paver 3. In this example, the data processing device 10 is arranged on the feeder 2 for processing the sensor data and generating travel commands. Since both sensor data of the position sensor devices 12, 18 and those of the distance sensor 15 are used, a sensor data fusion or a position alignment is performed in the data processing device 10 prior to the generation of the travel commands. The generated travel commands are sent to the road paver by means of the communication connection 19 and are implemented there by means of the paver control device 16 for the travel control of the road paver 3. By using different sensor techniques which are, in particular, based on different measurement principles, the automatic control of the road paver 3 can be designed particularly robust and failsafe.

Figure 6:
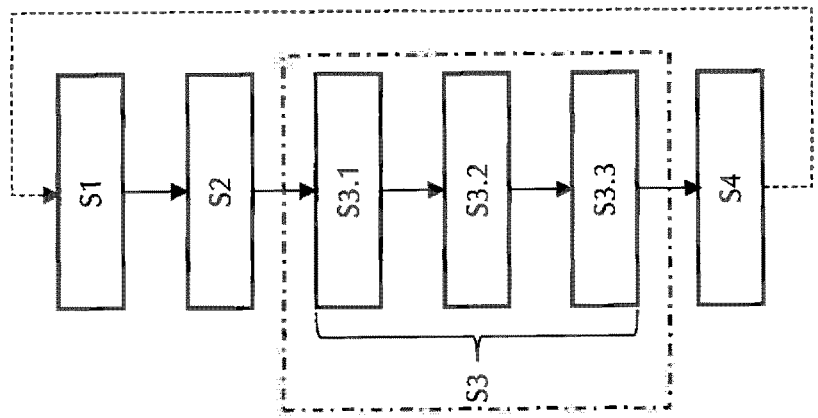
FIG. 6 is a flow chart of the method according to the present invention with additional method steps.
Figure 5:
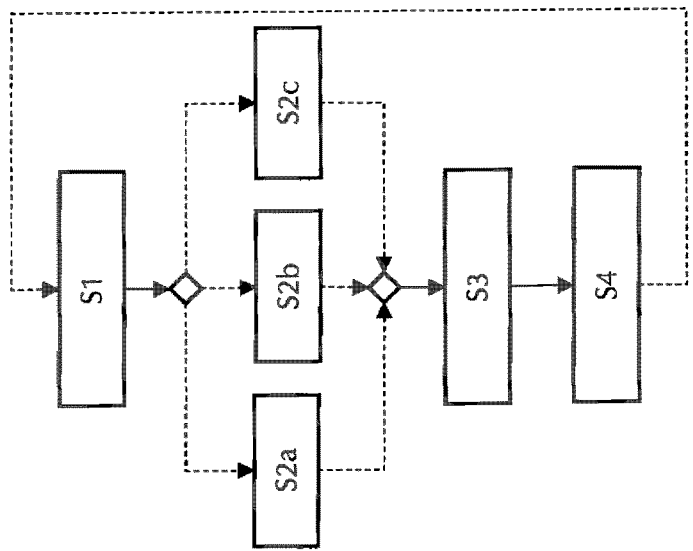
FIG. 5 is a flow chart of the method according to the present invention with alternative method steps.
Figure 4:
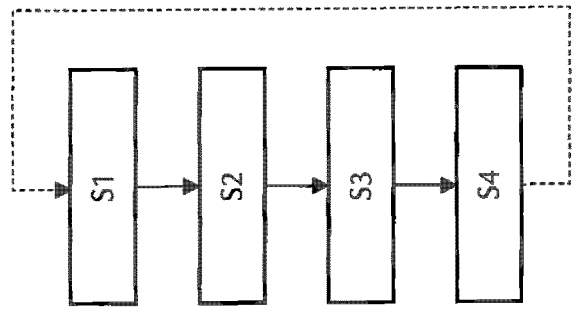
FIG. 4 is a flow chart of the method according to the present invention.

For further illustration of the present invention, flow charts of the method according to the present invention are shown in FIGS. 4 to 6. FIG. 4 shows the basic sequence of the method. In step S1, the operator drives the feeder. While this is effected continuously, in step S2 the movement and/or position data of the feeder are determined simultaneously although with a delay due to the generation and processing of the sensor data. However, the delay is only a few nano- or milliseconds and is practically negligible. In step S3, the data determined in step S2 are further processed and a travel command for automatic travel control of the road paver is generated in consideration of said data. The travel command may include direction, steering, acceleration and/or speed related information. Finally, this command is implemented automatically on the road paver in step S4, i.e., automatic travel of the road paver it is effected using the travel commands. The feeder is continuously driven by the machine operator so that new movement data and/or position data is continuously generated and, accordingly, new travel commands are continuously generated and implemented. Steps S1 to S4 are thus run through permanently, which process may, in particular, be based on a clocking. This means particularly for steps S2 to S4 that said steps are carried out at fixed time intervals.

FIGS. 5 to 6 show flow charts for preferred refinements of the method according to the present invention. FIG. 5 shows different alternatives for step S2, which can also be combined among each other. On the one hand, the movement data and/or position data can be determined according to step S2a in that control commands for the feeder are directly picked from a control system of the feeder. For example, the steering angle, the speed or the acceleration of the feeder can be read out from the control system of the feeder 2 so that this data can later be used for the travel command for the paver. In addition or as an alternative, sensor data for the position, orientation and/or speed of the feeder relative to the road paver can be determined according to step S2b. Steps S2a and S2b provide the advantage that in both cases the road paver may refer directly to the feeder without reference to external structures or systems being required. In the case that the determination of data is limited to steps S2a and S2b, paver and feeder form a self-sufficient unit. However, generating sensor data for the position, orientation and/or speed of the feeder relative to an external reference system and considering them when calculating the travel commands in a step S2c may also be advantageous. A sufficient accuracy assumed, in conjunction with the use of a position determining system on the road paver, it may be easier this way to configure the travel commands such that the road paver exactly follows the path of the feeder because a set of global position data can be constructed. In addition, systems which are typically used for determining sensor data in an external reference system, as, for example, satellite-based positioning systems, often require only one receiver, such as, for example, a GPS receiver, since the major part of the sensor system does not need to be mounted on the vehicle itself. Thus, the sensor system components required on the road paver can be reduced significantly, resulting in more favorable production cost of the road paver. The highest flexibility and accuracy of the method can be achieved by combining of all three procedures, which of course increases the cost for the required sensor system and also the complexity of the method.

In the flow chart shown in FIG. 6, step S3 is divided into the steps S3.1 to S3.3. The illustration explains a basic control system, wherein in step S3.1 target values for the movement data and/or position data of the road paver are generated based on the movement data and/or position data of the feeder. In step S3.2 the actual values for the movement data and/or position data of the road paver are determined, which can be effected by means of sensor technology mounted on the road paver. Finally, in step S3.3 a control command for automatic control of the road paver is generated in consideration of the target values and the actual values for the movement data and/or position data of the road paver.

Figure 7:
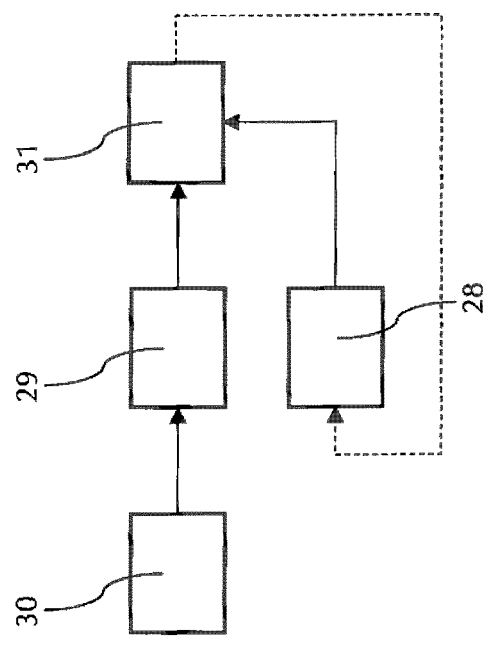
FIG. 7 is a scheme for generating an automatic control command.

This procedure is once again illustrated in FIG. 7 in a different way. Based on the movement data and/or position data 30 of the feeder (in particular, from the actual values of this movement data and/or position data), the target values 29 of the movement data and/or position data for the paver are generated, which then together with the actual values 28 of the position data and/or movement data for the paver serve as the basis for the generation of the travel command 31 for the paver. Since execution of this travel command influences the actual values 28 of the paver (indicated by the dashed arrow), a control loop for the movement data and/or position data 28 of the paver is created, in which the feeder appears as a disturbance source due to the target values 29 for the road paver generated from the movement data and/or position data 30 of the feeder.

Figure 8:
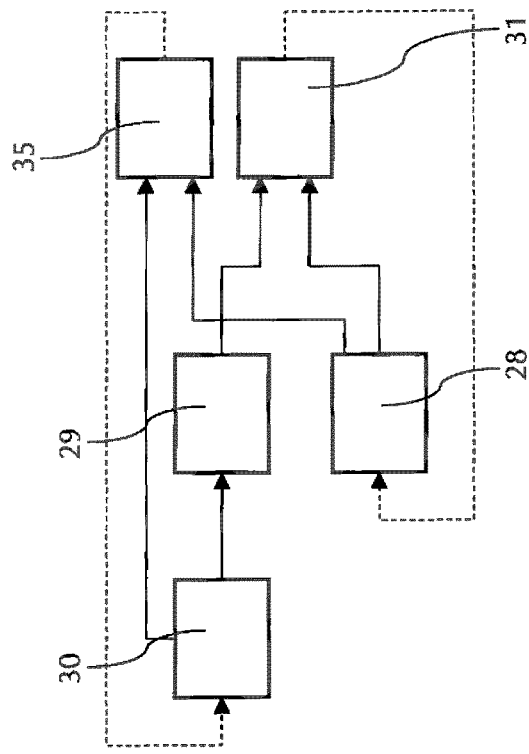
FIG. 8 is a scheme for the generation of an automatic control command with feedback.

FIG. 8 extends the method illustrated in FIG. 7 by a feedback to the feeder. In critical situations, it can be advantageous that besides generating a travel command 31 for the paver a control adjustment command 35 for the feeder is generated, which can then automatically be executed on the feeder. For example, this can be the case if, as described above in more detail, the distance d between paver and feeder cannot be kept within interval i by automatic control of the feeder. In this case, a control adjustment command 35 is generated for the feeder from the actual values 28 of the road paver and the actual values 30 of the feeder, which control adjustment command is subsequently executed on the feeder. This way, two control loops which are in relation to one another are obtained, as indicated by the dashed arrows.

Figure 9C:
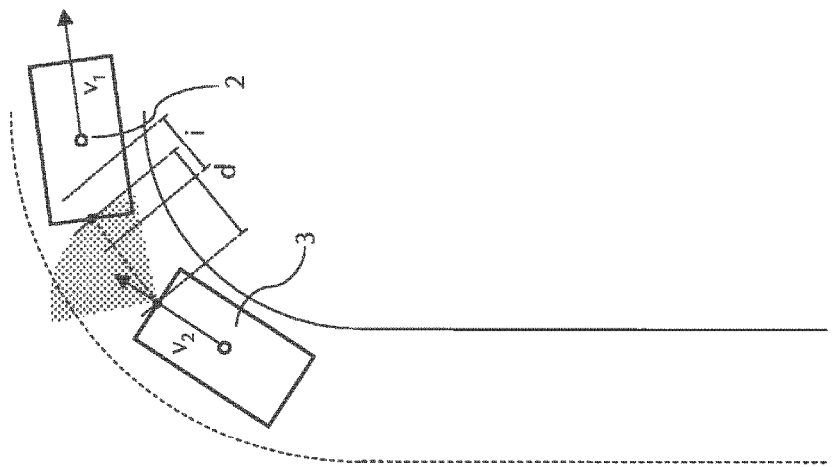
FIGS. 9*a*-9*c* are schematic top views of a work train in working operation.
Figure 9B:
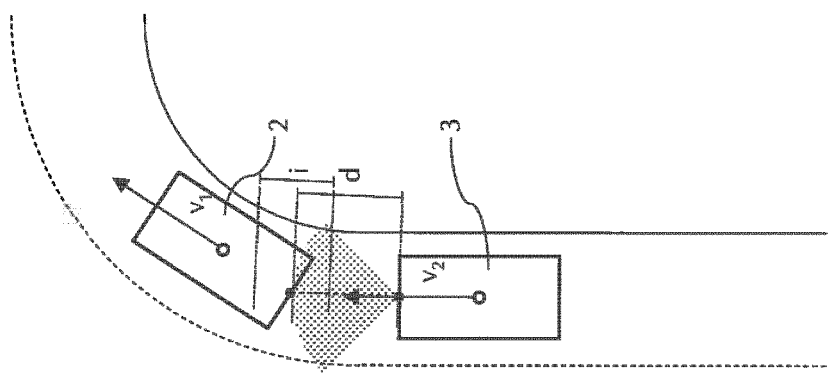
Figure 9A:
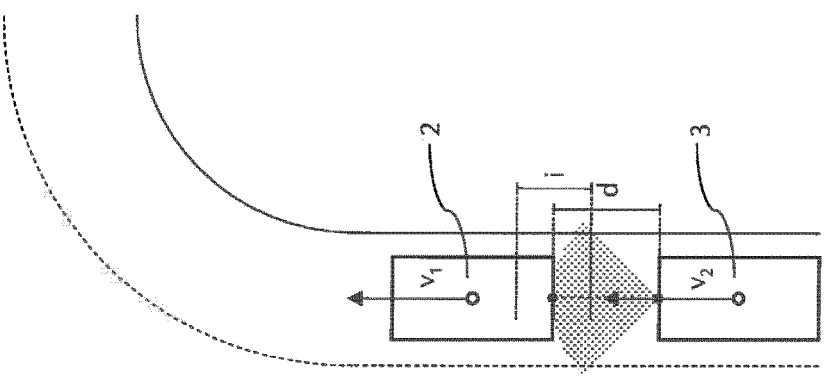

The remaining FIGS. 9*a* to 10*c* show the work train when continuously carrying out the method according to the present invention in two alternatives in a schematic bird's eye view. In FIG. 9*a*, the feeder 2 and the road paver 3 follow a straight path. The feeder 2 advances ahead with speed v1 and the road paver 3 follows with speed v2 at the distance d. In the example shown, v1 and v2 are equal, the road paver 3 thus follows the feeder 2 at a constant distance. FIG. 9*b* shows a later time in the working operation. The road paver 3 has now reached the position which the feeder 2 had taken at the time illustrated in FIG. 9*a*. Its orientation also corresponds to the orientation of the feeder 2 at the time illustrated in FIG. 9*a*. In the meantime, the feeder 2 has moved on and enters into a right turn. The distance d between both vehicles 2, 3 remained the same and thus corresponds to the distance d at the time illustrated in FIG. 9*a*. In FIG. 9*c*, the working operation has advanced even further. The road paver 3 has now also entered into the right turn. It assumes the exact same position the feeder 2 had at the time illustrated in FIG. 9*b*, the orientation is also the same. It can be seen that it is exactly on the path of the feeder 2. The distance d remains the same while road paver 3 and feeder 2 move with speed v1=v2, which is identical to the speeds at the times illustrated in FIGS. 9*a* and 9*b*. Thus, FIGS. 9*a* to 9*c* show an ideal sequence of the method, in which neither the road paver 3 nor the feeder 2 need to vary their speed so that both vehicles 2, 3 follow the path at a constant speed at any time. Therefore, distance d is essentially constant.

Figure 10C:
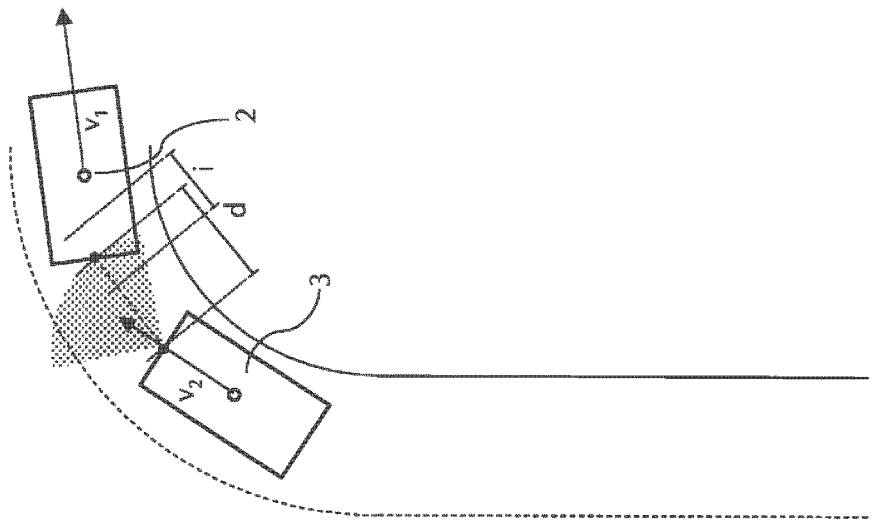
FIGS. 10a-10c are schematic top views of a work train in working operation, with varying distance between the vehicles.
Figure 10B:
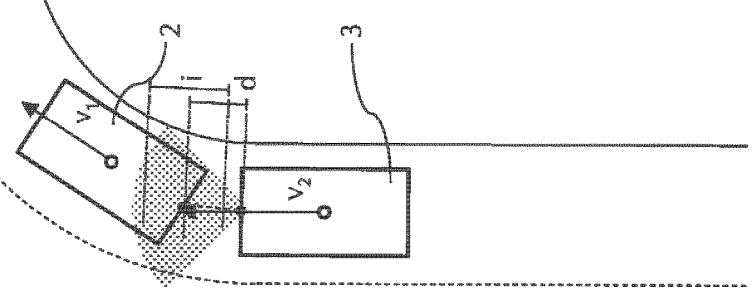
Figure 10A:
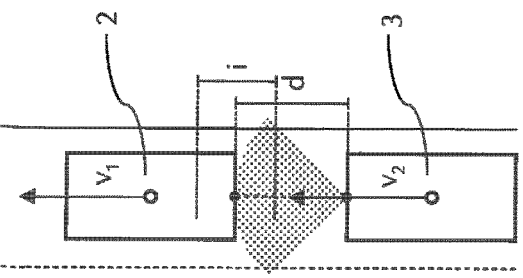

An alternative course of the working operation for the work train using the method according to the present invention is shown in FIGS. 10*a* to 10*c*. The state of the work train in FIG. 10*a* exactly corresponds to the state of the work train in FIG. 9*a*. However, it can be seen when comparing FIG. 10*b* to FIG. 9*b*, that in this case the feeder 2 brakes when entering into the turn. Since the road paver 3 continues travelling at the constant speed v2, the distance d between the two vehicles decreases. However, the distance d still is within the buffer interval i. As can be seen from FIG. 10*c*, the feeder 2 accelerates when leaving the turn in order to balance the distance, meaning that it temporarily advances faster than the road paver. Thus, distance d increases, so that finally the distance d again approximately corresponds to the distance d shown at the time illustrated in FIG. 10*a*.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A method for controlling a work train having a self-propelled road paver and a self-propelled feeder driving ahead of the road paver, comprising the steps of:
   S1: driving the feeder by a machine operator at the feeder;
   S2: determining position data of the feeder, the position data referring to the position or orientation of the feeder or to components or reference points arranged on the feeder relative to a reference system and/or movement data of the feeder, the movement data describing a time-dependent change of the position data referring to the feeder;
   S3: generating travel commands for automatic travel control of the road paver in response to the movement data and/or position data of the feeder; and
   S4: automatic travelling of the road paver using the travel commands with the road paver automatically performing or implementing the travel commands without intervention of a human or a manual input by a driver.

2. The method according to claim 1, wherein steps S1 to S4 are permanently run through during working operation in a clocked manner.

3. The method according to claim 1, wherein step S2 comprises at least one of the following steps:
   S2a: picking travel commands for the feeder from a control system of the feeder (2);
   S2b: generating sensor data for the position and/or orientation and/or speed of the feeder relative to the road paver; and
   S2c: generating sensor data for the position and/or orientation and/or speed of the feeder relative to an external reference system.

4. The method according to claim 1, wherein step S3 comprises the following steps:
   S3.1: generating target values for movement data and/or position data of the road paver based on the movement data and/or position data of the feeder;
   S3.2: determining actual values for the movement data and/or position data of the road paver; and
   S3.3: generating a travel command for automatic travel control of the road paver in consideration of the target values and the actual values for the movement data and/or position data of the road paver.

5. The method according to claim 1, wherein movement data and/or position data of the feeder from previous cycles are considered in step S3.

6. The method according to claim 1, wherein in step S3 the travel command is configured such that a distance between the feeder and the road paver is kept within a buffer interval, wherein a speed of the road paver is kept constant as long as the distance between the feeder and the road paver is within the buffer interval.

7. The method according to claim 1, wherein in step S3 the travel command is configured such that the road paver follows a path of the feeder, so that, when continuously performed, the road paver finally takes a current position of the feeder with a delay due to a distance and a speed.

8. The method according to claim 1, wherein steps S2 and S3 are performed at the road paver or steps S2 and S3 are performed at the feeder and the method thus comprises a transmission of travel commands from the feeder to the road paver, or that step S2 is performed at the feeder and step S3 is performed at the road paver and the method thus comprises a transmission of movement data and/or position data from the feeder to the road paver.

9. The method according to claim 1, wherein a feedback of the control of the road paver to the feeder is performed such that a warning notice is displayed at the feeder, and/or an automatic control adjustment is performed, if a distance between the feeder and the road paver is outside a buffer interval.

10. The method according to claim 1,
wherein in step S4 the automatic travelling of the road paver is performed using the travel commands depending on a hierarchic safety system which allows overriding the travel commands by manually triggered commands.

11. The method according to claim 10,
wherein the manually triggered commands comprise stop commands.

12. A work train, comprising a self-propelled road paver and a self-propelled feeder, wherein the feeder travels ahead of the road paver during working operation,
wherein the road paver comprises a paver control device which is configured for automatic control of a travelling operation of the road paver, that the feeder or the road paver comprises a sensor device for generating movement data and/or position data of the feeder, and that the feeder or the road paver comprises a data processing device which is configured to generate travel commands for the paver control device in response to the movement data and/or the position data of the feeder.

13. The work train according to claim 12,
wherein the sensor device comprises a distance sensor device for measuring a distance between the road paver and the feeder.

14. The work train according to claim 12,
wherein the sensor device comprises a position sensor device which is configured for determining the position of the feeder or of the road paver relative to the other and/or relative to an external reference point or reference system.

15. The work train according to claim 14,
wherein the reference point or reference system comprises a total station or a satellite navigation system.

16. The work train according to claim 12,
wherein the work train comprises a communication device with a transmitter for contactless communication at the feeder and with a receiver at the road paver compatible to the transmitter, wherein the transmitter is configured for transmitting the movement data and/or position data of the feeder or the travel commands to the receiver.

17. The work train according to claim 12,
the road paver comprising a lateral operator panel,
wherein the lateral operator panel of the road paver comprises an emergency switch and/or a distance screen for displaying a distance between the road paver and the feeder, wherein the emergency switch is configured for generating a stop command which is hierarchically higher than the travel commands for automatic control of the road paver.

18. The work train according to claim 12,
wherein the road paver is configured without an operator platform.

* * * * *